(No Model.)
H. G. REIST.
BRUSH HOLDER FOR DYNAMO ELECTRIC MACHINES.
No. 500,614. Patented July 4, 1893.
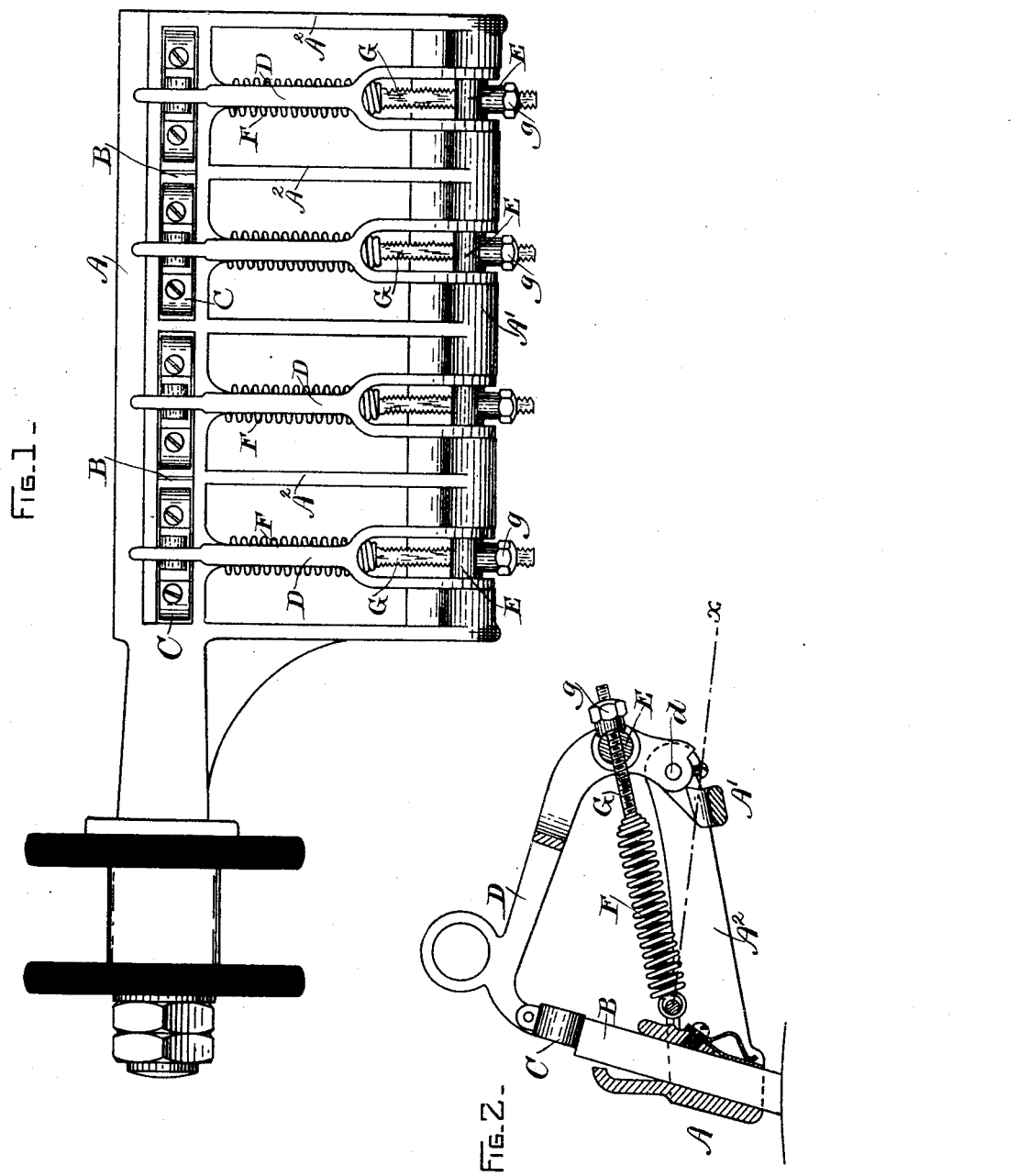
Witnesses
Alec F. Macdonald
A. C. Crane
Inventor
Henry G. Reist
by Bentley & Blodgett
Attys.

UNITED STATES PATENT OFFICE.

HENRY G. REIST, OF LYNN, MASSACHUSETTS, ASSIGNOR TO THE GENERAL ELECTRIC COMPANY, OF NEW YORK.

BRUSH-HOLDER FOR DYNAMO-ELECTRIC MACHINES.

SPECIFICATION forming part of Letters Patent No. 500,614, dated July 4, 1893.

Application filed January 28, 1893. Serial No. 460,010. (No model.)

*To all whom it may concern:*

Be it known that I, HENRY G. REIST, a citizen of the United States, residing at Lynn, in the county of Essex and State of Massachusetts, have invented certain new and useful Improvements in Brush-Holders for Dynamo-Electric Machines, of which the following is a specification.

My invention relates to dynamo electric machines, and it consists in improvements in brush holders for such machines, as hereinafter set forth and particularly pointed out in the claims.

The object of the invention is to provide great current carrying capacity with but little weight, to simplify and economize the construction, and facilitate the assemblage and taking apart of the holder. It is particularly adapted for use with carbon brushes.

In the drawings Figure 1 is a top plan view and Fig. 2 is a cross sectional elevation of a brush holder embodying my improvements.

The holder comprises an open frame composed of a front bar A and a rear bar A' united by cross bars $A^2$, preferably all integral. In the front bar are one or more sockets, in which are placed the carbon brushes B. If desired, two or more brushes may be placed side by side in the same socket, as shown in Fig. 1. On each brush rests a spring follower C, attached to the front end of an arm D, whose rear end is hinged to the rear bar A', preferably by being received in a recess in said bar. This end of the arm is bifurcated, and between the legs of the fork is held a transverse rotatable block E. Fastened to the front rail A is a spring F, to which is attached an adjusting screw G, flattened on one or more sides and sliding in a hole of corresponding shape in the block E, whereby the screw is prevented from rotating. A nut $g$ meshes with the screw back of the block, against which it is held by the tension of the spring. To lock the nut from accidental turning by the jarring of the machine, the end of the nut is shaped to fit the adjacent surface of the block upon which it bears, which may be curved, or angular, either convex or concave.

When the brush arms are lifted off the brushes, they can be turned over until the spring is brought down to the dotted line $x$, in which position it locks the arm open, being below the axis of the hinge $d$.

What I claim as new, and desire to secure by Letters Patent, is—

1. A brush holder comprising a front rail having one or more sockets for the brushes, a rear rail, multiple connecting cross bars and spring actuated arms carrying brushes between each pair of cross bars.

2. A brush holder comprising a socketed front rail, a rear rail, multiple connecting cross bars and spring actuated brush arms hinged to said rear rail between each pair of cross bars.

3. A brush holder comprising a front rail, a rear rail, and connecting cross bars, brush arms having bifurcated rear ends hinged to the rear rail, and tension springs having adjusting screws passing between the legs of the forked arms, substantially as described.

4. A brush holder comprising one or more bifurcated hinged brush arms, a rotatable block held between the legs of each arm, a tension spring having a non rotatable screw sliding through a hole in said block, and a nut resting against the back of said block, substantially as set forth.

5. The combination with a block having a cylindrical or angular surface, of a non rotatable screw sliding in a hole in said block, a nut having one end shaped to fit the surface of the block, and a spring exerting a pull upon the screw and tending to keep the nut in engagement with the block, substantially as described.

6. A brush holder comprising a hinged bifurcated brush arm, a rotatable block held between the legs of the fork, and having a curved or angular surface, a tension spring, a screw attached thereto, having a flat face and sliding in a hole of corresponding shape in the block, and a nut having one end shaped to fit the adjacent surface of the block, substantially as set forth.

In witness whereof I have hereunto set my hand this 25th day of January, 1893.

HENRY G. REIST.

Witnesses:
JOHN W. GIBBONEY,
BENJAMIN B. HULL.